Aug. 15, 1950 H. D. YOUNG ET AL 2,519,305
RADIO APPARATUS
Filed Nov. 6, 1948
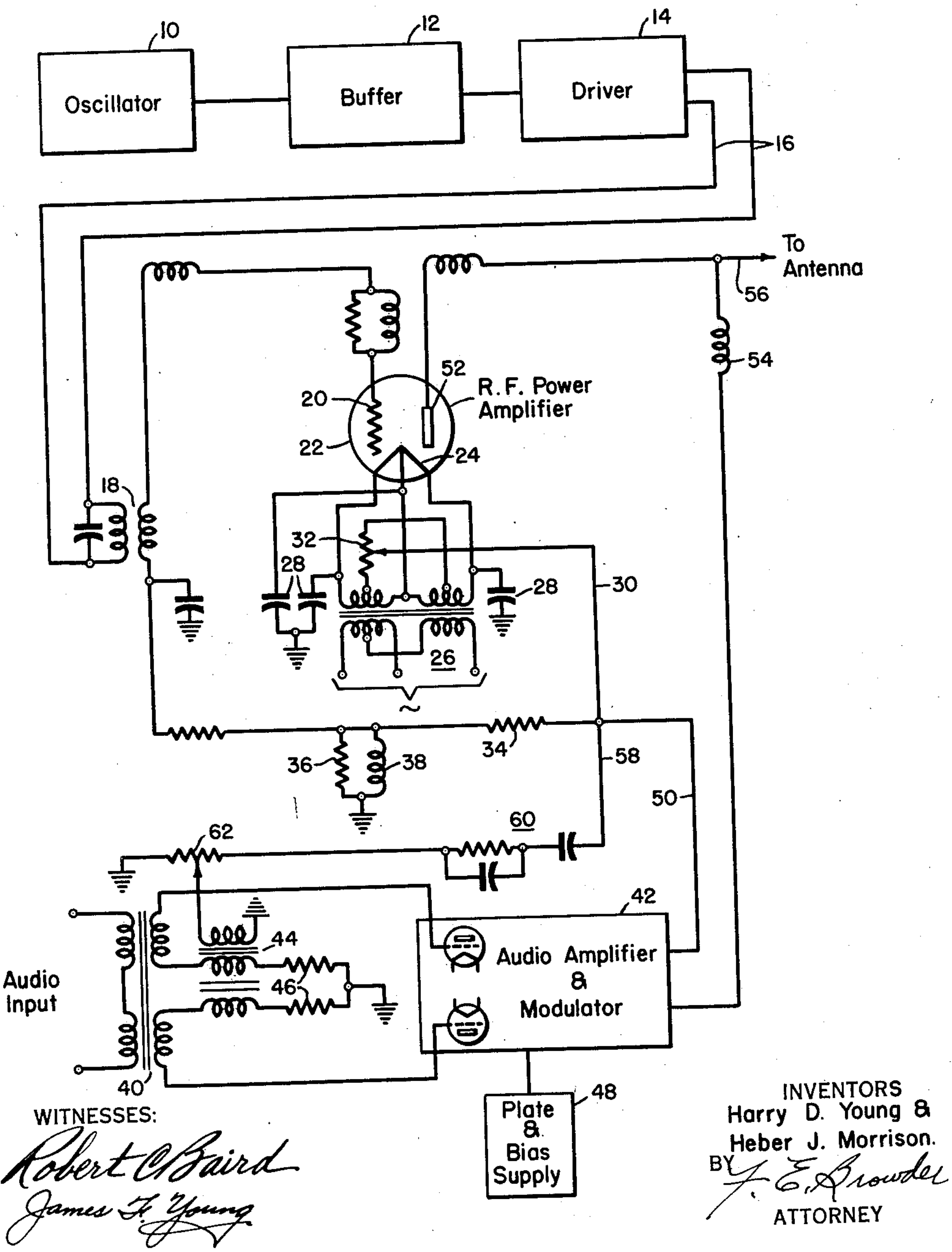
WITNESSES:
Robert C. Baird
James F. Young
INVENTORS
Harry D. Young &
Heber J. Morrison.
BY F. E. Browder
ATTORNEY Patented Aug. 15, 1950

2,519,305

UNITED STATES PATENT OFFICE 2,519,305

RADIO APPARATUS

Harry D. Young, Pittsburgh, Pa., and Heber J. Morrison, Baltimore, Md., assignors to Westinghouse Electric Corporation, East Pittsburgh, Pa., a corporation of Pennsylvania Application November 6, 1948, Serial No. 58,758

12 Claims. (Cl. 332—37)

This invention relates to radio frequency oscillators, of the type used for radio transmission of voice or code signals, and particularly to improvements in the reduction of amplitude-modulated noise in the carrier output of amplitude-modulated oscillators.

An ideal amplitude-modulated radio transmitter would provide an output, in the absence of signal modulation, of constant frequency and amplitude, free from hum modulation or noise components of any source whatever. In practice, this ideal is only partially achieved, largely due to hum introduced into the carrier from the filament circuit of the power amplifier tube or tubes, as well as noises generated in the preceding radio frequency and audio stages and fed to the grid of the output stage.

It has been proposed to reduce or eliminate the amplitude modulated noise in the carrier output by providing negative voltage feedback around the audio section of the transmitter, a system which also improves the audio quality in a known manner, by reduction of distortion. Obviously such a solution is completely ineffective to eliminate or reduce those noise components originating in the R. F. section of the transmitter, or due to hum in the power amplifier filament circuit. Moreover, such a loop results in a reduction in the internal impedance of the audio amplifier, as is well known, which in turn allows the R. F. power amplifier plate current to be more readily modulated by noise applied to its grid by the preceding R. F. stages and by filament hum within the tube.

Another proposal for the reduction of amplitude modulated noise in the carrier is to rectify a portion of the radio frequency output from the power amplifier stage, and apply this rectified voltage as negative or inverse feedback to the audio section of the transmitter. While such a system is capable of a considerable reduction in carrier noise, it has several inherent disadvantages. Any spurious voltages imposed on the power amplifier by virtue of its being connected to the transmitting antenna are rectified and applied to the audio input just as is the feedback voltage, and if these spurious voltages are large in magnitude, as would be occasioned, for example, by lightning at or near the antenna, a violent surge is placed upon the audio section. In the same way, noises of lesser magnitude picked up by the antenna are amplified through the audio channel and in turn appear in the carrier output. Moreover, in the event that the radio frequency excitation of the power amplifier stage is removed, the feedback is also removed, and the resulting increase in gain of the audio section may damage this section. At the same time, the adjustment of such an overall rectified feedback system is quite critical.

It is an object of our invention to provide a system for reducing or eliminating from the carrier output, amplitude modulated noises generated in any part of the transmitter circuit, in such a way as to avoid the above-noted shortcomings of previous proposals.

More specifically, it is an object of the invention to provide a circuit utilizing negative feedback for the reduction of noise, but in which the feedback is not reduced nor eliminated when the power amplifier stage is unexcited.

A further object is to provide such a system which is free from the possibility that noise or surges picked up by the antenna may be transmitted over the feedback path to modulate or damage the audio section of the transmitter.

Still another object is to provide a circuit in which the selection of power amplifier tubes in the R. F. stages is rendered less critical from the noise standpoint.

Another object is to provide a circuit in which the negative feedback voltage is obtained from the cathode circuit of the final R. F. power stage, rather than from its output or plate circuit.

The above and other objects and advantages of the invention will best be understood by referring to the accompanying drawing, the single figure of which is a schematic circuit diagram of an amplitude-modulated transmitter in accordance with the invention.

Referring now to the drawing, there is illustrated an amplitude-modulated transmitter whose R. F. exciter portion is illustrated in block form as comprising an oscillator 10, which may be of the crystal-controlled type, a buffer amplifier 12, and a driver amplifier 14, the R. F. output of the latter being conducted by leads 16 to the grid driving transformer 18 connected in a known manner across the grid 20 of an R. F. power amplifier tube 22. Tube 22 is here shown as provided with a cathode 24 having dual sections energized from a phase filament transformer 26, the filament leads being by-passed to ground by usual by-pass capacitors such as indicated by numeral 28. The effective cathode connection 30 is taken from a bleeder resistor 32 connecting the midpoints of the secondaries of the filament transformer, and is grounded through a series resistor 34 (whose purpose will be explained below), and resistor 36 and inductance 38 in parallel.

The audio section of the transmitter, provided to modulate the output voltage of the power amplifier 22, is shown as comprising a usual form of input audio transformer 40, whose secondaries are conducted respectively to the input grids of the multi-stage push-pull audio amplifier indicated by block 42. The other lead from each section of the push-pull input transformer 40 is connected, through one section of a double-secondary feedback transformer 44, to ground through resistors 46.

Plate and grid bias voltage supplies for the various stages are provided in any desired manner, the supply being indicated by block 48 in the drawing, since the particular nature of plate and bias supplies forms no part of the present invention.

The amplified audio output voltage from amplifier 42 is connected to ground by a lead 50, and to the plate 52 of the R. F. power output tube 22 through a usual plate inductance 54, and the output is conducted to the utilization network or antenna as indicated at 56. It is to be understood that any desired or well known system of modulating the output tube 22 may be employed, the specific details of such systems being omitted from the present drawing for the sake of clearness.

In accordance with the invention, an audio frequency feedback voltage generated across cathode-to-ground resistor 34 is applied to the input to the audio amplifier 42, via a lead 58 through a frequency correcting network 60 and a potentiometer 62, whose arm is adjusted to pick off the desired feedback voltage and apply it to the primary of the transformer 44 whose secondaries are in series with the input to amplifier 42. Since the feedback voltage is obtained from the cathode circuit of tube 22, the feedback circuit is established when the filament of tube 22 is lighted, and its magnitude does not depend upon the presence or absence of R. F. excitation of the grid of this tube. Moreover, the application of plate voltage to tube 22 changes only the D. C. potential across resistor 34, and has no effect on the degree of audio feedback.

Transformer 44 is phased so that the A. C. feedback voltage is applied in a negative, inverse, or degenerative sense, so that any noise applied to the grid of tube 22, or developed in its filament circuit, is subjected to a degree of cancellation in amplifier 42, the degree being regulated by adjustment of potentiometer 62 in accordance with the requirements of operation, or of the noise characteristics of a particular power output tube 22 used in the transmitter.

Our invention is to be distinguished from prior proposals which deal with rectifying a sample of the R. F. output energy from the final R. F. amplifier stage, and applying the same as negative feedback to a prior stage, and also from prior systems in which hum or noise is attempted to be reduced by a feedback loop around the audio or modulator portions only of the transmitter. The present invention accomplishes an overall reduction or elimination of noise or hum frequencies from the transmitter output, without the disadvantages of the above prior proposals, which were pointed out in detail above, in connection with the statement of the objects of the present invention.

We have illustrated the invention herein in connection with a particular type of transmitter circuit, in order to emphasize its essential features and the best mode of applying the same in accordance with the patent statutes, but it is to be understood that many changes and modifications in the details of transmitter design may be made without departing from the spirit of our invention, whose scope is defined by the appended claims.

We claim as our invention:

1. A system for reducing the amplitude modulated noise in the output of a radio frequency transmitter of the type comprising a radio frequency power output stage having a cathode, an anode and at least one control electrode, a filament heater for said cathode, and an audio frequency modulator having stages arranged to modulate the anode-to-cathode current of said output stage, said system comprising a resistor in the filament heater circuit of said output stage, and connections for applying at least a portion of the audio frequency voltage developed across said resistor in series-opposing relation to the input of said audio frequency modulator.

2. A system for reducing the amplitude modulated noise in the output of a radio frequency transmitter of the type comprising a radio frequency power output stage having a cathode, an anode and a control electrode, and an audio frequency modulator having stages arranged to modulate the anode-to-cathode current of said output stage, said system comprising a resistor in the cathode circuit of said output stage, a circuit for applying at least a portion of the audio frequency voltage developed across said resistor in series-opposing relation to the input stage of said modulator, and frequency-correcting filter elements in said circuit.

3. A system for reducing the amplitude modulated noise in the output of a radio frequency transmitter of the type comprising a radio frequency power output stage having a cathode, an anode and at least one control electrode, a filament heater for said cathode, and an audio frequency modulator having stages arranged to modulate the anode-to-cathode current of said output stage, said system comprising a resistor in the filament heater circuit of said output stage, a circuit for applying at least a portion of the audio frequency voltage developed across said resistor in series-opposing relation to the input stage of said audio frequency modulator, and means for adjusting the magnitude of said portion.

4. A system for reducing the amplitude modulated noise in the output of a radio frequency transmitter of the type comprising a radio frequency power output stage having a cathode, an anode and at least one control electrode, and a push-pull input audio frequency modulator having stages arranged to modulate the anode-to-cathode current of said output stage, and connections for applying at least a portion of the audio frequency voltage developed across said resistor in phase-opposing relation to the input stage of said audio frequency modulator, said connections including transformer means having a pair of secondary windings each connected in a respective push-pull input line of said input stage.

5. A radio frequency transmitter of the type comprising a power output stage having an anode, a cathode and at least one control electrode, a filament heater circuit for said cathode means for applying a carrier frequency to said control electrode, a modulator amplifier, a source of anode potential, connections for modulating said source of anode potential in accordance with an audio frequency input to said modulator amplifier, a resistor in the filament heater circuit of said output stage, and means for applying a feedback voltage consisting of the voltage developed across said resistor due to tube noises only to the input stage of said modulator amplifier, in phase opposition to the signal voltages applied thereto.

6. A radio frequency transmitter of the type comprising a power output stage having an anode, a cathode, and at least one control electrode, a filament heater circuit for said cathode means for applying a carrier frequency to said control electrode, a modulator amplifier, a source of anode potential, connections for modulating said source of anode potential in accordance with an audio frequency input to said modulator amplifier, an impedance in the filament heater circuit of said output stage, and means for applying at least a portion of the audio frequency voltage developed across said impedance due to tube noises only to the input stage of said modulator amplifier, in phase opposition to the signal voltages applied thereto.

7. A radio frequency transmitter of the type comprising a power output stage having an anode, a cathode and at least one control electrode, a cathode heater circuit means for applying a carrier frequency to said control electrode, a modulator amplifier, a source of anode potential for said output stage, connections for modulating said source of anode potential in accordance with an audio frequency input to said modulator amplifier, and means for applying at least a portion of the audio frequency current developed in said cathode heater circuit to the input stage of said modulator amplifier, in phase opposition to the signal voltages applied thereto.

8. A radio frequency transmitter of the type comprising a power output stage having an anode, a cathode having a heater circuit and at least one control electrode, means for applying a carrier frequency to said control electrode, a modulator amplifier, a source of anode potential, connections for modulating said source of anode potential in accordance with an audio frequency input to said modulator amplifier, an impedance in the cathode heater circuit of said output stage, and means for applying an adjustable portion of the audio frequency voltage developed across said impedance to the input of said modulator, in phase opposition to the signal voltages applied thereto.

9. The method of reducing amplitude modulated noise occuring in the output circuit of a radio frequency amplifier power stage having anode, cathode heater and control electrode circuits, and in which the anode voltage of said stage is modulated at audio frequencies, which comprises deriving a voltage of audio frequency from the current in the cathode heater circuit, and applying said voltage in opposing phase to the audio frequencies modulating said anode voltage.

10. A system for reducing the amplitude modulated noise in the output of a radio frequency transmitter comprising a radio frequency power output stage having a cathode, an anode and at least one control electrode, an audio frequency modulator having stages arranged to modulate the anode-to-cathode current of said output stage, a filament transformer having a secondary in circuit with said cathode, a bleeder resistor connected across said secondary, a second resistor connected to said bleeder resistor, and connections for applying at least a portion of the audio frequency voltage developed across said second resistor in series-opposing relation to the input of said audio frequency modulator.

11. A system for reducing the amplitude modulated noise in the output of a radio frequency transmitter comprising a radio frequency power output stage having a cathode, an anode and at least one control electrode, an audio frequency modulator having stages arranged to modulate the anode-to-cathode current of said output stage, a filament transformer having a secondary in circuit with said cathode, a first impedance connected across said secondary, a second impedance connected to said first impedance, and connections for applying at least a portion of the audio frequency voltage developed across said second impedance in series-opposing relation to the input of said audio frequency modulator.

12. A system for reducing the amplitude modulated noise in the output of a radio frequency transmitter comprising a radio frequency power output stage having a cathode, an anode and at least one control electrode, an audio frequency modulator having stages arranged to modulate the anode-to-cathode current of said output stage, a filament transformer having dual secondaries in circuit with said cathode, a tap connection on each of said dual secondaries, a bleeder resistor having a variable tap connection, said bleeder resistor being connected between said tap connections on said secondaries, a second resistor connected to said variable tap connection on said bleeder resistor in the cathode circuit of said output stage, and connections for applying at least a portion of the audio frequency voltage developed across said second resistor in series-opposing relation to the input of said audio frequency modulator.

HARRY D. YOUNG.
HEBER J. MORRISON.

REFERENCES CITED

The following references are of record in the file of this patent:

UNITED STATES PATENTS

| Number | Name | Date |
|---|---|---|
| 2,372,101 | Madsen | Mar. 20, 1945 |